(No Model.)
F. G. BALDWIN.
MARKING AND SHADING PEN.
No. 549,098. Patented Nov. 5, 1895.
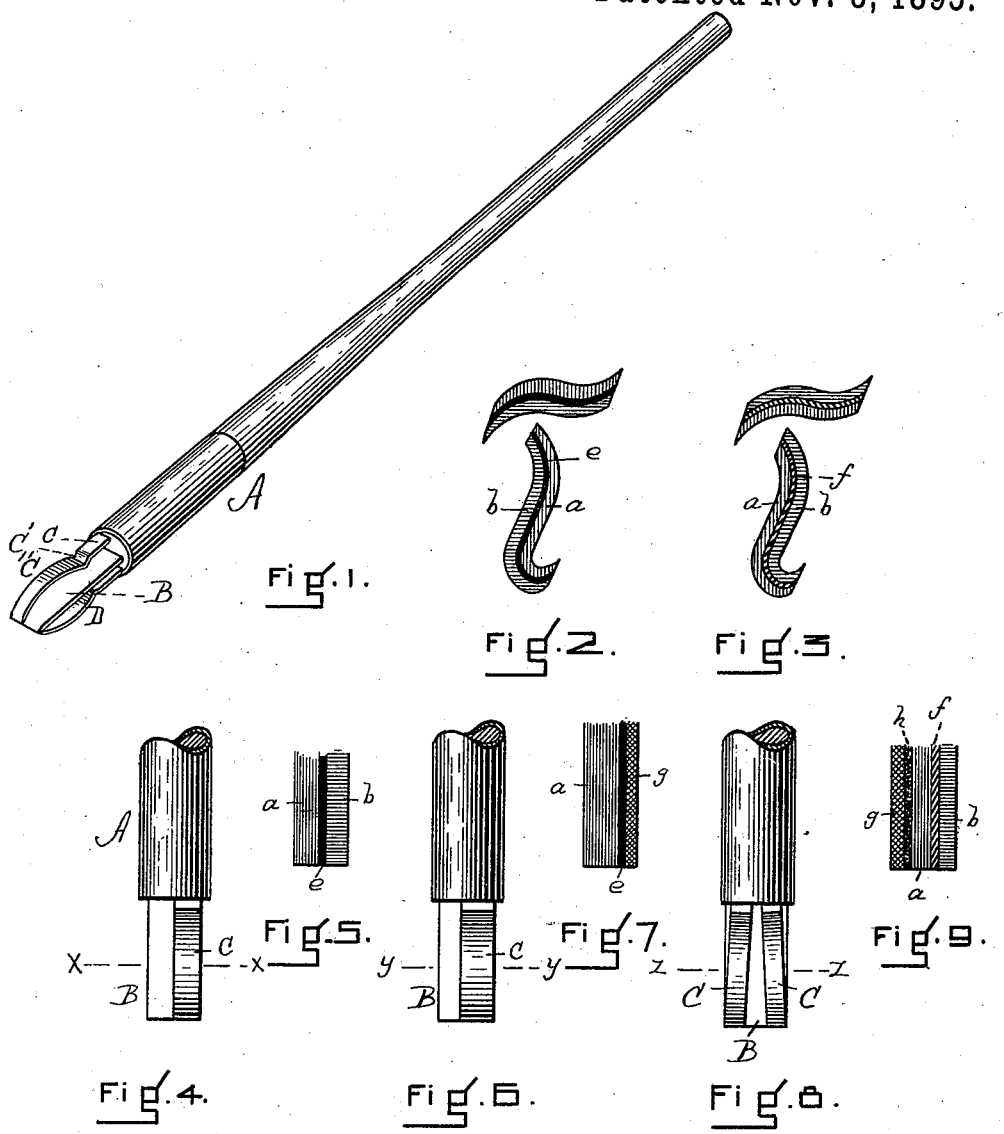

UNITED STATES PATENT OFFICE.

FREDERICK G. BALDWIN, OF FOREST CITY, FLORIDA.

MARKING AND SHADING PEN.

SPECIFICATION forming part of Letters Patent No. 549,098, dated November 5, 1895.

Application filed August 7, 1895. Serial No. 558,514. (No model.)

*To all whom it may concern:*

Be it known that I, FREDERICK G. BALDWIN, a citizen of the United States, residing at Forest City, in the county of Orange and State of Florida, have invented a new and useful Improvement in Marking and Shading Pens, of which the following is a specification.

This is an improved pen for marking on posters, placards, sign-cards, and other surfaces; and it has for its object to make a mark which will be shaded in two or more colors, said colors being distinct from each other or blended, as desired.

The device comprises a suitable handle, a somewhat stiff flat broad blade extending centrally from the lower end of said handle, and one or more blades or nibs extending from the same end of said handle on each side of said central blade, said outer blades or nibs being in contact with the central blade at their and its outer ends and then spreading apart on the opposite sides of said central blade out of contact therewith.

The nature of the invention and its operation in detail are fully described below, and illustrated in the accompanying drawings, in which—

Figure 1 is a perspective view of my improved shading-pen with one outer blade on each side of the central blade next the opposite edges thereof, the upper outer blade being next the left-hand edge of the central blade and the lower outer blade being next the right-hand edge of the central blade and each of said outer blades extending to the center of the central blade. Figs. 2 and 3 illustrate specimens of the work done by the shading-pen. Fig. 4 is an enlarged elevation of the lower end of the pen-holder and the blades attached thereto, the upper blade being next the right-hand edge of the central blade and the lower blade next the left-hand edge thereof, said outer blades extending to the center of the central blade, as in Fig. 1. Fig. 5 illustrates a specimen of the work performed by the pen with the blades arranged as in Fig. 4. Fig. 6 is a view similar to that shown in Fig. 4, with the exception that the upper outer blade extends beyond the center of the central blade, and thus practically overlaps the under blade. Fig. 7 illustrates a specimen of the work produced by the pen with the blades arranged as shown in Fig. 6. Fig. 8 is a similar view with two outer or curved blades on the upper side of the central blade and next the outer edge thereof and a single outer or curved blade on the under side of the central blade set centrally—that is, between the upper outer blades. Fig. 9 is an illustration of a specimen of the work produced by the pen with the blades arranged as in Fig. 8. Fig. 10 is a section taken on line $x$, Fig. 4. Fig. 11 is a section taken on line $y$, Fig. 6. Fig. 12 is a section taken on line $z$, Fig. 8. Fig. 13 is an elevation of the lower end of the pen-holder set so as to obtain an edge view of the blades.

Similar letters of reference indicate corresponding parts.

In Figs. 2, 3, 5, 7, and 8 similar shading-lines indicate corresponding colors.

A represents an ordinary handle.

B is a flat blade or spring-plate extending centrally from the lower end of and in line with the handle A.

In Fig. 1, C is an outer blade or nib extending from the lower end of the handle above the central blade B, and preferably a little thinner than the central blade. This blade C is preferably bent or notched inward at C' and then sweeps outward into substantially the curved shape shown at C" and comes into contact at its outer end with the outer end of the upper surface of the blade B.

D is the under of the outer blades and is of exactly the same shape as the blade C and has its end come in contact with the outer end of the under surface of the blade B.

As far as the shape is concerned, the above description applies to the outer blades shown in all the figures.

In Fig. 1 the upper outer blade C has its outer edge flush with the left-hand edge of the central blade B, while its inner edge extends to the center of said blade B—that is to say, is just one-half its width. The under outer blade D has its edge flush with the right-hand edge of the blade B and extends to the center thereof. Thus each outer blade extends to the center of the central blade, and neither outer blade overlaps the other. Now, if the pen were placed in contact with black coloring-matter in such a manner that the color would enter the space between the blade C and the central blade B and in similar manner yellow coloring-matter were inserted in the space between the blade D and the blade B the effect illustrated in Fig. 2 would be produced, in which a indicates black shading, b yellow shading, and e a black central line produced by the black coloring-matter at the inner edge of the blade C. Of course in this figure the shading a is produced by the upper blade C and the shading b by the under blade D. This is with the understanding that the pen is moved with a downstroke. Now if the pen with the blades arranged as in Fig. 1 is reversed, so that the blade C with its black coloring-matter is on the under side and the blade D with its yellow coloring-matter is on the upper side, the effect illustrated in Fig. 3 is produced, in which a represents black shading, b yellow shading, and f a central line of yellow.

In the arrangement shown in Figs. 4 and 10, in which the outer blades are exactly reversed from the position indicated in Fig. 1—that is to say, the upper blade C is next the right-hand edge and the lower blade D next the left-hand edge of the central blade B—a downstroke will produce the effect shown in Fig. 5, in which the black shading is on the left, the yellow shading on the right, and the black line in the center.

In the arrangement shown in Figs. 6 and 11 the upper outer blade C extends beyond the center of the blade B, and hence overlaps the under outer blade D. The upper blade C is provided with a black color and the under blade D with a red color. The effect produced is shown in Fig. 7, in which the blade D produces the red shading g and the blade C produces the black shading a. Moreover, the effect is not only to move the black line e to the right of the center, but also to blend the two colors, so that the shading a works up into blended colors toward the line e.

In the arrangement shown in Figs. 8 and 12 two outer blades C are located on the upper side and next the opposite edges of the central blade B, while the under outer blade D is set centrally next the under side of the blade B, each of the outer blades being one-third of the width of the central blade. If a red color be applied within the right-hand blade C, as shown in Figs. 8 and 12, a yellow color within the left-hand blade C, and a black color within the central blade D, a downstroke will produce the effect indicated in Fig. 9, in which a is the black, b the yellow, g the red, f a deep shade line or mark of yellow and h a deep shade line or mark of red.

It will be noticed, first, that the deep shade lines or marks e, f, and h are produced by the color at the inner edges of the outer blades and not by the color at the outer edges of said blades; second, that the said marks or shade-lines are at the exact line over which said edges of the outer blades travel, and, third, that said marks or lines are of the color contained in the upper of the outer blades. In drawing the pen over the paper the upper blades prevail over the under blades as far as shading or heavy marking is concerned, as will be seen by reference to Fig. 9, in which the black a does not shade into lines at its sides, for the reason that the black color is made by the under blade. On the other hand the yellow b and red g shade into lines f and h, because those colors are produced by the upper blades and the inner edges of said blades, are free to shed color and to produce the lines at f h. So in Fig. 2 the black central line e is produced because the upper blade contains black coloring-matter, and in Fig. 3 that which was the upper blade in Fig. 2 is now the under blade, and the yellow central line f is produced by the upper blade, which has yellow coloring-matter. The upper blade always prevails over the under blade and sheds color, so as to make a line, because the pressure on the paper slightly bends the central blade and causes the upper blade to extend a little beyond it, and hence freely deliver its coloring-matter, and the upper blade always blends colors into a line at its inner edge, because at its outer edge there is no other color to blend with.

It is evident that the number of outer blades can be increased and their widths varied to produce different effects without departing from the principle of the invention.

Having thus fully described my invention, what I claim, and desire to secure by Letters Patent, is—

A marking and shading pen consisting essentially of a handle, the broad central blade B extending from the lower end of said handle and in line therewith, and one or more outer blades C extending from the handle on each side of said broad central blade, said outer blades having their outer ends in contact with the outer end of the central blade on opposite sides thereof and being formed up from said central blade to afford space for the reception of coloring matter, substantially as set forth.

FREDERICK G. BALDWIN.

Witnesses:
HENRY W. WILLIAMS,
A. M. JELLISON.